United States Patent

[11] 3,627,041

[72] Inventor Richard A. Heckman
Castro Valley, Calif.
[21] Appl. No. 32,678
[22] Filed Apr. 28, 1970
[45] Patented Dec. 14, 1971
[73] Assignee The United States of America as represented by the United States Atomic Energy Commission

[54] GAS-RECOVERY SYSTEM
2 Claims, 1 Drawing Fig.
[52] U.S. Cl. .................................................. 166/63,
166/247
[51] Int. Cl. .................................................. E21b 43/00
[50] Field of Search ............................................ 166/247,
228, 63

[56] References Cited
UNITED STATES PATENTS
2,119,563 6/1938 Wells ............................ 166/228
2,665,644 1/1954 Wells ............................ 166/228
3,013,583 12/1961 Stanley ......................... 166/243
3,465,818 9/1969 Dixon ........................... 166/247
3,465,819 9/1969 Dixon ........................... 166/247

Primary Examiner—James A. Leppink
Attorney—Roland A. Anderson

ABSTRACT: A system for recovering gas from a gas-bearing rock formation comprising means for fracturing the rock formation by a nuclear explosive and means for gas collection including a pipe sectionally perforated, which section is filled with steel balls to provide internal bracing to the pipe against the explosion compressive shock and to insure a flow path for released gas entering the pipe perforations from the fractured rock formation to the ground level. The pipe may then be recovered intact upon exhaustion of the gas.

Patented Dec. 14, 1971
3,627,041
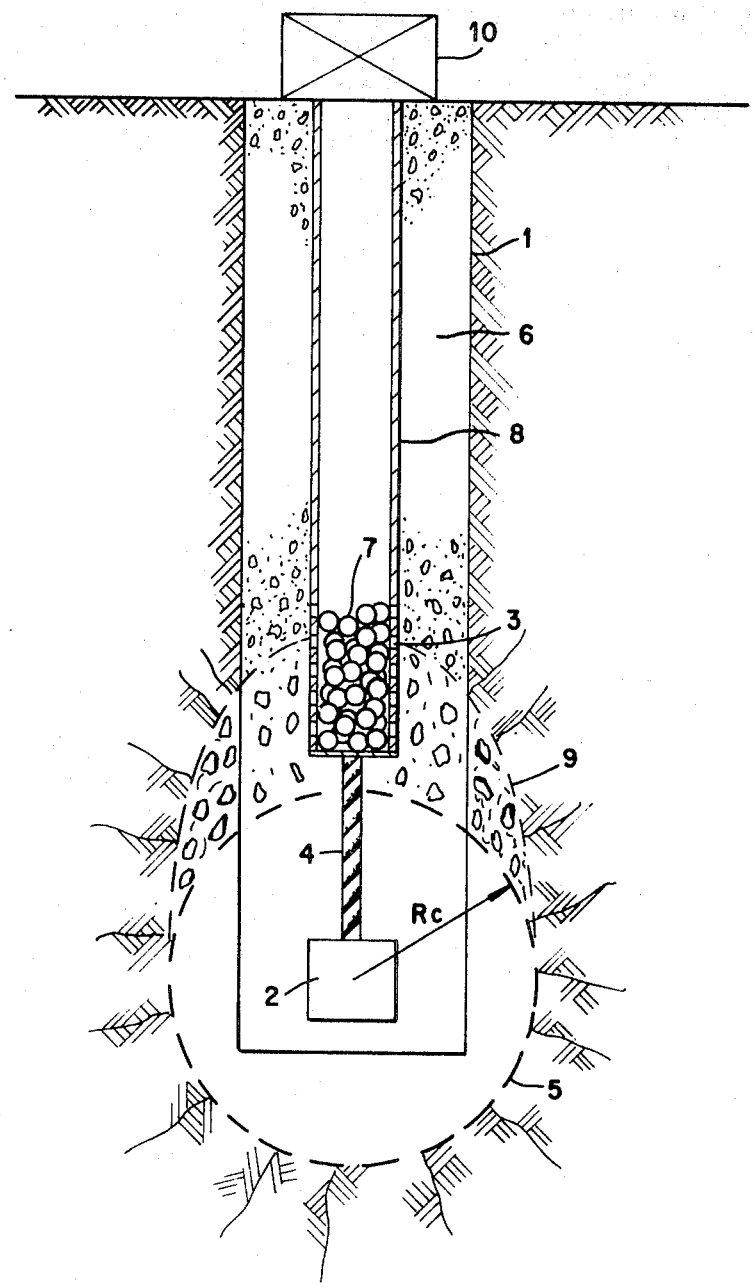
INVENTOR.
Richard A. Heckman
BY
ATTORNEY.

GAS-RECOVERY SYSTEM

BACKGROUND OF THE INVENTION

The invention described herein was made in the course of, or under, Contract No. W-7405-Eng-48 with the United States Atomic Energy Commission.

Nuclear explosions have been proposed as a means for recovering gas from underground gas-bearing rock formations. In present practice, the nuclear device is positioned at the end of a long pipe which is subsequently filled with grout or concrete. After the device is exploded, the grout is drilled through to provide a flow path for the released gas to the ground surface. As settled grout is brittle, often the compressive shock of the explosion fractures the grout and deforms the pipe so that it may not be removed nor reused. In addition, the pipe is sometimes pinched off completely and the gas flow is totally obstructed.

SUMMARY OF THE INVENTION

The present invention comprises a gas-recovery system whereby the lowest portion of the pipe is perforated and filled with steel balls instead of grout or concrete. The balls have limited individual movement and thus provide a flexible internal bracing for the pipe which effectively resists the compressive shock of the explosion. The interstices between the balls permit a flow path for the released gas to move through the pipe perforations to the surface of the ground.

To remove the portion of the steel-ball-filled pipe out of the fireball region surrounding the nuclear device at time of detonation, and subsequently, the cavity, the nuclear device is suspended by a cable attached to the end of the pipe. The cable does not transmit the compressive shock and thus decouples the pipe from the shock. The pipe, internally braced, then remains undeformed in the fracture zone and out of the formed nuclear cavity.

Accordingly, it is an object of the present invention to provide a means to recover gas from underground gas-bearing rock formations fractured by nuclear explosions.

It is also an object of the present invention to provide a means to preserve the integrity of gas conductive pipe in the fracture zone of a gas-bearing rock formation during and after the nuclear explosion causing the fracture zone, while maintaining a flow path for the gas.

BRIEF DESCRIPTION OF THE DRAWING

The drawing is a schematic diagram of the gas-recovery system incorporating the invention.

DETAILED DESCRIPTION

The embodiment of the invention shown in the figure comprises the emplacement hole 1 through which the nuclear-device-pipe combination is lowered into place. Nuclear device 2 is attached to perforated pipe section 3 of the pipe 8 by cable 4. It is found that a cable length of 1.75 Rc, where Rc is the calculated radius of the postshot cavity 5, is sufficient to decouple pipe 8 from the explosive shock. Once the nuclear device 2 has been lowered into place, the emplacement hole 1 is filled with stemming material 6 and compacted to provide resisting force to the upward pressures created by the detonating nuclear device 2. Steel balls 7 are placed in the perforated section 3 of pipe 8 up to a level calculated to the upper limit of the postshot rubble zone. The lower end of perforated section 3 is sealed with a cap to hold the balls 7 in place. Shutoff valve 10 is provided at the ground level in order to regulate the flow of the gas.

The nuclear device is detonated forming a postshot cavity and fracturing the gas-bearing rock formation to form a chimney like rubble zone. The fractured rock then releases the entrapped gas. The gas seeps through the perforated pipe section and works its way up through the steel balls and out of the pipe regulated by the shutoff valve. Upon exhaustion of the gas, the pipe may be recovered intact and reused.

The unique combination of the perforated pipe section, the steel balls contained therein, and the cable suspending the fracturing nuclear device from the end of the perforated pipe section permit both the nuclear device and the entire gas recovery system to be lowered into place in one operation. The gas-recovery system perforated pipe section is sufficiently decoupled from the fracturing device by the suspending cable so that it is not in the immediate postshot cavity, but well within the postshot rubble zone. The integrity of the perforated pipe section is preserved during the creation of the rubble zone by the nuclear explosion by the flexible internal bracing of the contained steel balls.

I claim:

1. A system for recovering gas from underground gas-bearing rock formations comprising nuclear explosive means for fracturing the rock formations to release entrapped gas and means for removing released gas from said fractured rock formations including pipe means extending from the ground surface to the fractured rock formation, said pipe means defining a perforated section in said pipe means proximate said fractured rock formation; steel balls contained within said perforated pipe section whereby released gas may enter said pipe perforations and penetrate the interstices between the steel balls; and valve means connected to the pipe means at the ground surface to regulate said recovered gas flow; said nuclear explosive means attached to and suspended from said perforated pipe section by cable means whereby said pipe means may be decoupled from the compressive shock caused by the explosion of said nuclear-explosive means.

2. The system for recovering gas as defined in claim 1 wherein said cable means length is at least 1.75 times the calculated postshot cavity radius created by the explosion of said nuclear-explosive means.

* * * * *